United States Patent
Debnath et al.

(10) Patent No.: US 12,130,234 B2
(45) Date of Patent: Oct. 29, 2024

(54) CORRECTION OF LIGHT-SHIFT EFFECTS IN TRAPPED-ION QUANTUM GATES

(71) Applicant: IonQ, Inc., College Park, MD (US)

(72) Inventors: Shantanu Debnath, Lanham, MD (US); Vandiver Chaplin, Brooklyn, NY (US)

(73) Assignee: IonQ, Inc., College Park, MD (US)

( * ) Notice: Subject to any disclaimer, the term of this patent is extended or adjusted under 35 U.S.C. 154(b) by 0 days.

(21) Appl. No.: 18/540,391

(22) Filed: Dec. 14, 2023

(65) Prior Publication Data

US 2024/0110876 A1    Apr. 4, 2024

Related U.S. Application Data

(63) Continuation of application No. 18/048,300, filed on Oct. 20, 2022, now Pat. No. 11,879,847.

(60) Provisional application No. 63/270,190, filed on Oct. 21, 2021.

(51) Int. Cl.
  *G01J 3/44*    (2006.01)
  *G01N 21/65*   (2006.01)
  *G06N 10/40*   (2022.01)

(52) U.S. Cl.
  CPC ............ *G01N 21/65* (2013.01); *G06N 10/40* (2022.01)

(58) Field of Classification Search
  CPC ......... G01N 21/65; G01J 3/44; A61B 5/0075; G06N 10/00; G06N 10/20; G06N 10/40
  See application file for complete search history.

(56) References Cited

U.S. PATENT DOCUMENTS

| | | |
|---|---|---|
| 10,998,163 B2 | 5/2021 | Monroe et al. |
| 2019/0138928 A1 | 5/2019 | Monroe et al. |
| 2019/0378033 A1* | 12/2019 | Figgatt ............... G06N 10/40 |
| 2020/0219001 A1 | 7/2020 | Kim et al. |
| 2020/0301241 A1 | 9/2020 | Duan et al. |

* cited by examiner

*Primary Examiner* — Abdullahi Nur
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to the correction of light-shift effects in trapped-ion quantum gates. Techniques are described for light-shift correction of single qubit gates when the gates are implemented using counter-propagating Raman laser beams and when the gates are implemented using co-propagating Raman laser beams. Moreover, techniques are also described for light-shift correction of two-qubit gates.

20 Claims, 21 Drawing Sheets

900

1100 ⟶

```
┌─────────────────────────────────────┐
│  Apply a pair of Raman laser beams  │
│  to a single trapped ion used for   │
│  the single qubit gate              │
│                1110                 │
└─────────────────────────────────────┘
                  │
                  ▼
┌─────────────────────────────────────┐
│  Determine one or more parameters   │
│  that describe a relationship       │
│  between a gain factor of one of    │
│  the Raman laser beams and a        │
│  light-shift effect that causes a   │
│  change in resonance of qubits      │
│  states by coupling of the qubit    │
│  states to other states of the      │
│  single qubit gate                  │
│                1120                 │
└─────────────────────────────────────┘
                  │
                  ▼
┌─────────────────────────────────────┐
│  Dynamically adjust a gain of RF    │
│  source for the one Raman laser     │
│  beam based on the one or more      │
│  parameters to correct for          │
│  dephasing errors in the single     │
│  qubit gate caused by the change    │
│  in the resonance of the qubit      │
│  states                             │
│                1130                 │
└─────────────────────────────────────┘
```

Apply a pair of Raman laser beams to each trapped ion used for a qubit in the two-qubit gate
1210

Determine for each qubit in the two-qubit gate, a single parameter that describes a relationship between a gain factor of one of the Raman laser beams applied to the respective trapped ion of the qubit and a light-shift effect that causes a change in resonance of the qubit states of the qubit by coupling of the qubit states with other states of the qubit
1220

Dynamically adjust for each qubit in the two-qubit gate, a gain of an RF source for the one Raman laser beam applied to the respective trapped ion of the qubit based on the single parameter to correct for dephasing errors in the two-qubit gate caused by the change in the resonance of the qubit states in each qubit in the two-qubit gate
1230

FIG. 12

CORRECTION OF LIGHT-SHIFT EFFECTS IN TRAPPED-ION QUANTUM GATES

CROSS REFERENCE TO RELATED APPLICATIONS

This application claims is a continuation of U.S. patent application Ser. No. 18/048,300, filed Oct. 20, 2022, which claims priority to and the benefit from U.S. Provisional Application No. 63/270,190, filed on Oct. 21, 2021, the contents of each of which are incorporated herein by reference in their entirety.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Described herein are techniques for the correction of light-shift effects in trapped-ion quantum gates. More specifically, a method is described for correcting light-shift effects in single qubit gates that includes applying a pair of Raman laser beams to a single trapped ion used for the single qubit gate. The method also includes determining one or more parameters that describe a relationship between a gain factor of one of the Raman laser beams and a light-shift effect that causes a change in resonance of qubit states of the single qubit gate by coupling of the qubit states to other states of the single qubit gate. The method further includes dynamically adjusting a gain of RF source for the one Raman laser beam based on the one or more parameters to correct for dephasing errors in the single qubit gate caused by the change in the resonance of the qubit states. A quantum computer configured to implement this method is also described.

Additionally, a method is described for correcting light-shift effects in two-qubit gates that includes applying a pair of Raman laser beams to each trapped ion used for a qubit in the two-qubit gate. The method also includes determining for each qubit in the two-qubit gate, a single parameter that describes a relationship between a gain factor of one of the Raman laser beams applied to the respective trapped ion of the qubit and a light-shift effect that causes a change in resonance of the qubit states of the qubit by coupling of the qubit states with other states of the qubit. The method further includes dynamically adjusting for each qubit in the two-qubit gate, a gain of an RF source for the one Raman laser beam applied to the respective trapped ion of the qubit based on the single parameter to correct for dephasing errors in the two-qubit gate caused by the change in the resonance of the qubit states in each qubit in the two-qubit gate. A quantum computer configured to implement this method is also described.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 11 illustrates a method for correcting light-shift effects in single qubit gates in accordance with aspects of this disclosure.

FIG. 12 illustrates a method for correcting light-shift effects in two-qubit gates in accordance with aspects of this disclosure.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well-known components are shown in block diagram form, while some blocks may be representative of one or more well-known components.

Quantum gates in trapped-ion quantum computers (e.g., in the processors or processing units of the quantum computers), which are implemented using Raman transitions, are prone to dephasing errors that result from changes in the frequency splitting of qubits when illuminated by laser beams that are used to drive the gates. The momentary change in the qubit frequency occurs due to a light-shift, which is responsible for differentially shifting each of the two energy levels defining the qubit and is a function of the instantaneous light field amplitude. The amount of light-shift experienced by a qubit depends on the schemes of implementing the various kinds of quantum gates in the processor. For each gate scheme, it is possible to devise techniques to accurately measure the relationship of the light-shift to the applied laser amplitude modulation used in the gate, and therefore be able to dynamically compensate for this shift thereby eliminating dephasing errors and improving the fidelity of executed quantum algorithms.

Solutions to the issues described above are explained in more detail in connection with FIGS. 1-10, with FIGS. 1-3 providing a background of QIP systems or quantum computers, and more specifically, of atomic-based QIP systems or quantum computers.

Figure 1:
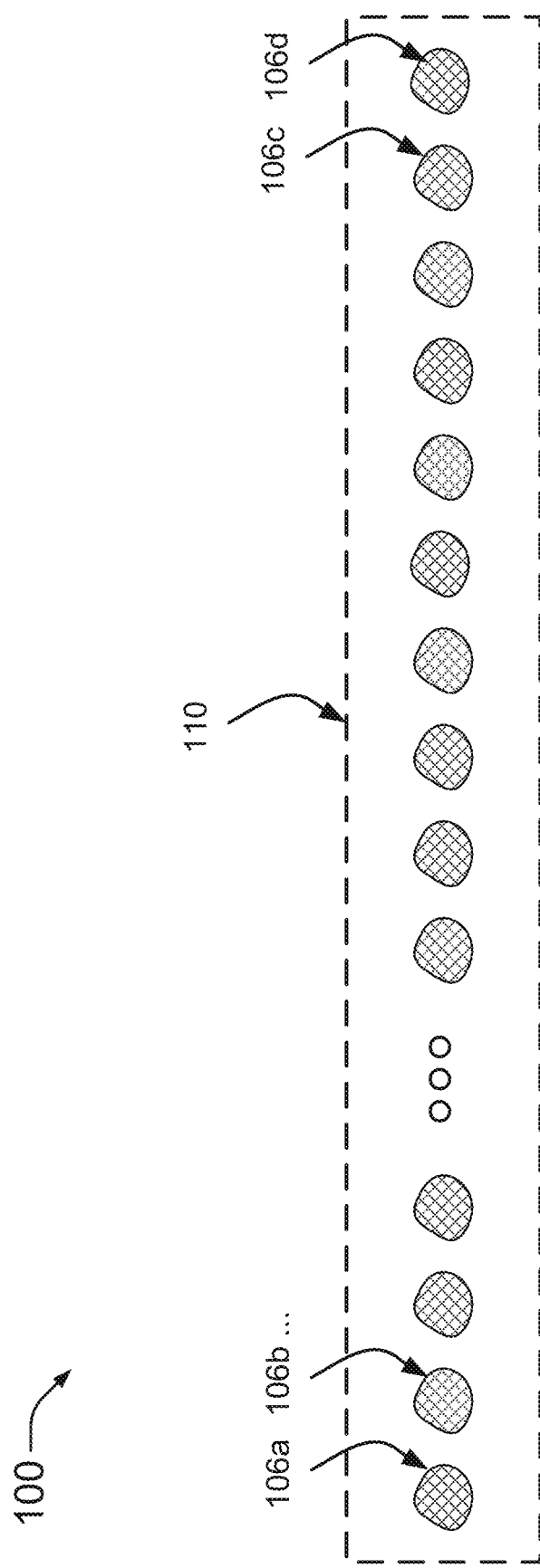
FIG. 1 illustrates a view of atomic ions a linear crystal or chain in accordance with aspects of this disclosure.
Figure 2:
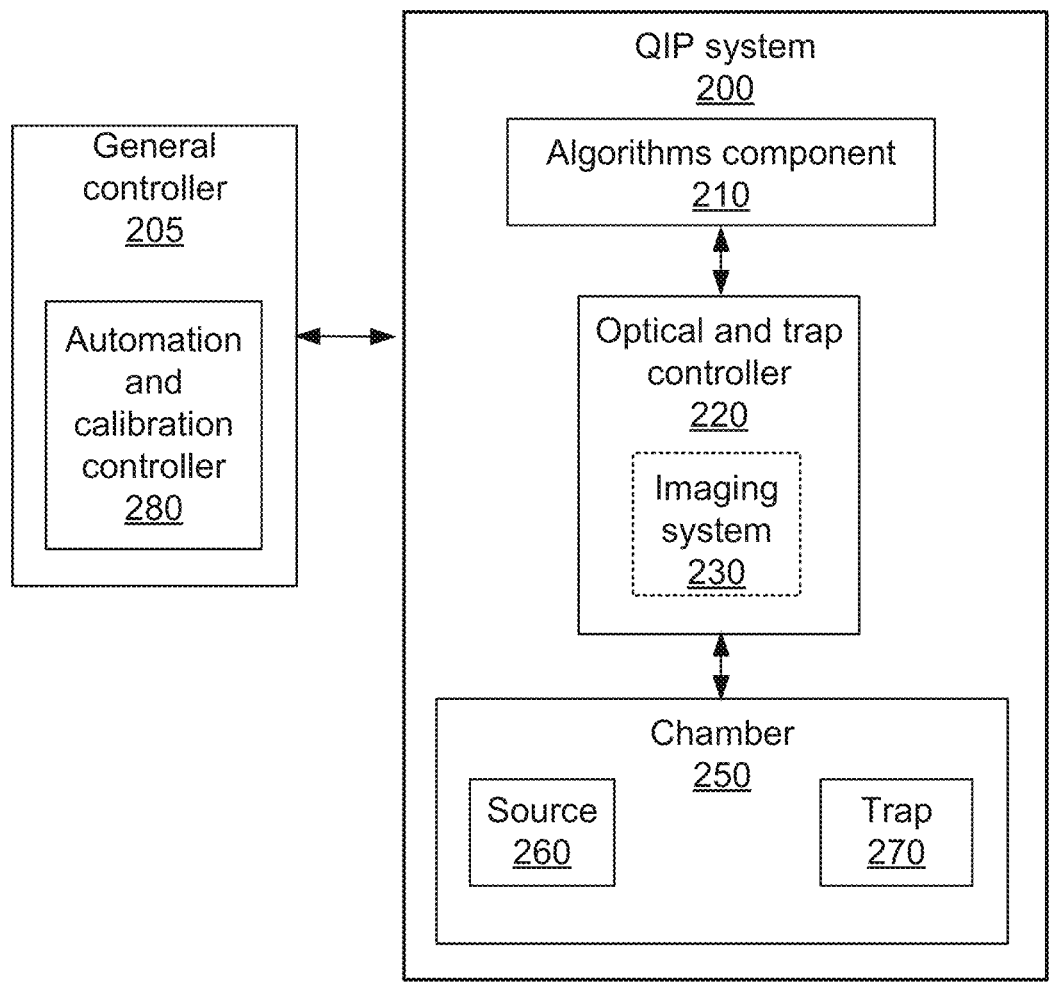
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system. Moreover, a quantum processor or quantum processing unit may indicate a portion of the quantum computer or QIP system that includes the chain 110 and uses the ions 106 in the chain 110 to perform quantum operations.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be ytterbium ions (e.g., $^{171}$yb$^+$ ions), for example. The ions are illuminated with laser (optical) radiation tuned to a resonance in $^{171}$yb$^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The trap 270 may be associated with the quantum processor or quantum processing unit in the QIP system 200. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the general controller 205 and/or the automation and calibration controller 280. The general controller 205 and/or the automation and calibration controller 280 may control and/or instruct portions of the QIP system 200 to perform certain functions associated with the correction of light-shift effects. For example, the general controller 205 and/or the automation and calibration controller 280 may control and/or instruct the algorithms component 210, the optical and trap controller 220 and its sub-components, and/or the chamber 250 and its sub-components.

Figure 3:
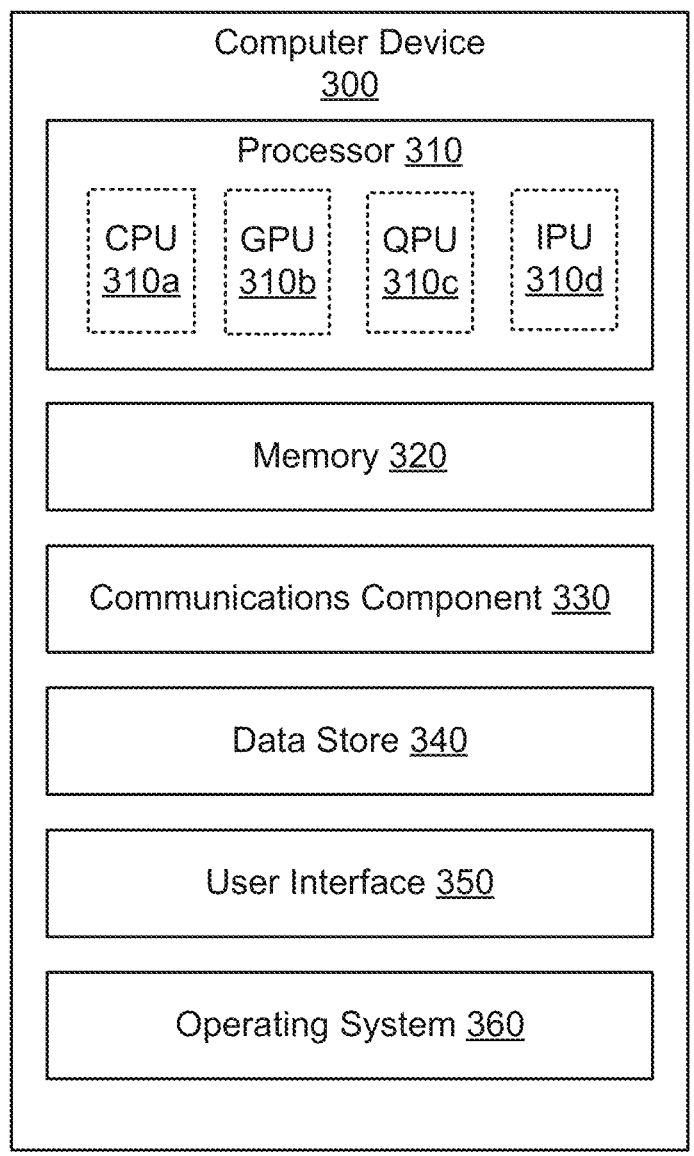
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

The processor 310 and/or the QPU 310c may control and/or instruct portions of the computer device 300 to perform certain functions associated with the correction of light-shift effects.

In connection with the systems described in FIGS. 1-3, this disclosure identifies and describes compensation or correction schemes for light-shifts that may occur in, for example, three gate schemes in trapped-ion quantum processors: 1) co-propagating single qubit gates (SQG), 2) counter-propagating SQGs, and 3) counter-propagating two-qubit gates (TQG). The following techniques, which are implemented and performed for light-shift correction, may involve these steps:

A. For each gate scheme, the light-shift induced qubit frequency shift (or simply light-shift) is first measured and its relationship to the radio frequency (RF) amplitude (referred to as gain factor or gain parameter g) is derived. The gain parameter g is a parameter set in control software or firmware for linearly modulating the Raman beam field amplitude while driving the gate.

B. Compensation for the qubit dephasing due to the light-shift is achieved by applying a calibrated dynamic frequency shift of the Raman beams using gain scaling factors of light-shifts that are calibrated a priori in (A) for each type of gate and for each qubit. This can be implemented in software or firmware by programming RF that controls Raman laser beams, which individually address each qubit in a trapped-ion chain.

Figure 4:
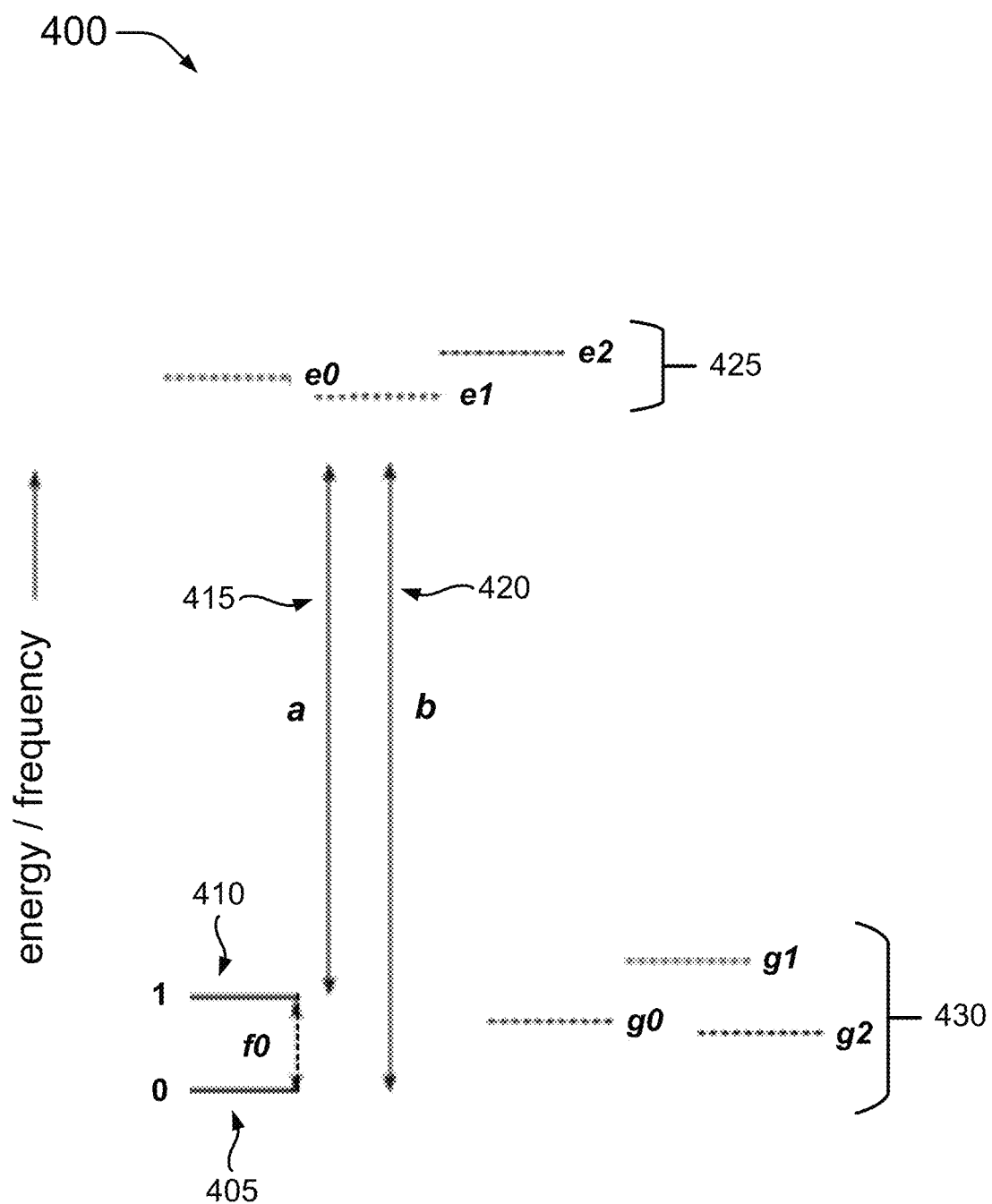
FIG. 4 illustrates an example of energy level diagram for a Raman process in accordance with aspects of this disclosure.
Figure 5A:
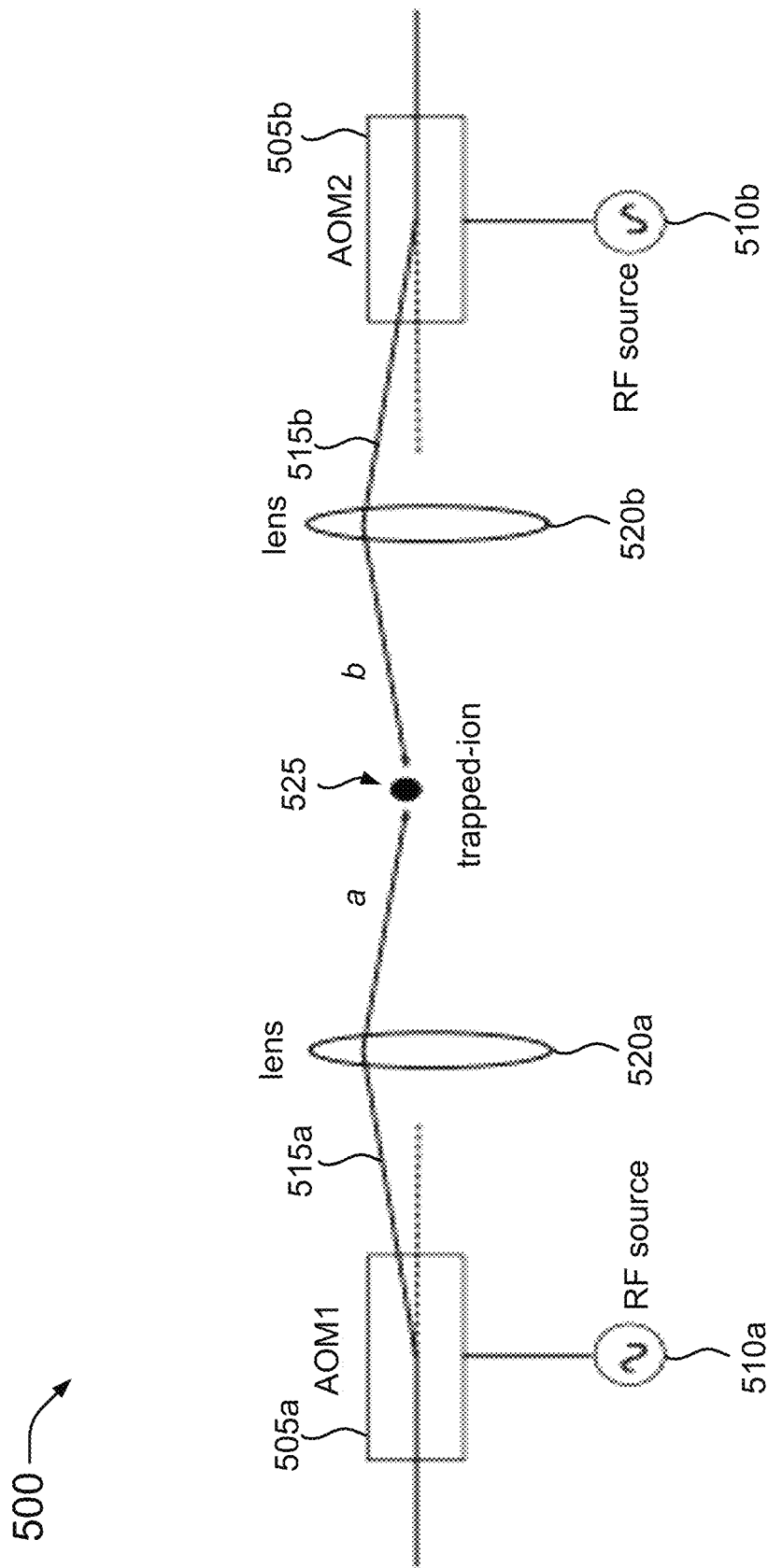
FIG. 5A illustrates an example of a single qubit gate (SQG) implementation using non-copropagating Raman beams in accordance with aspects of this disclosure.
Figure 5B:
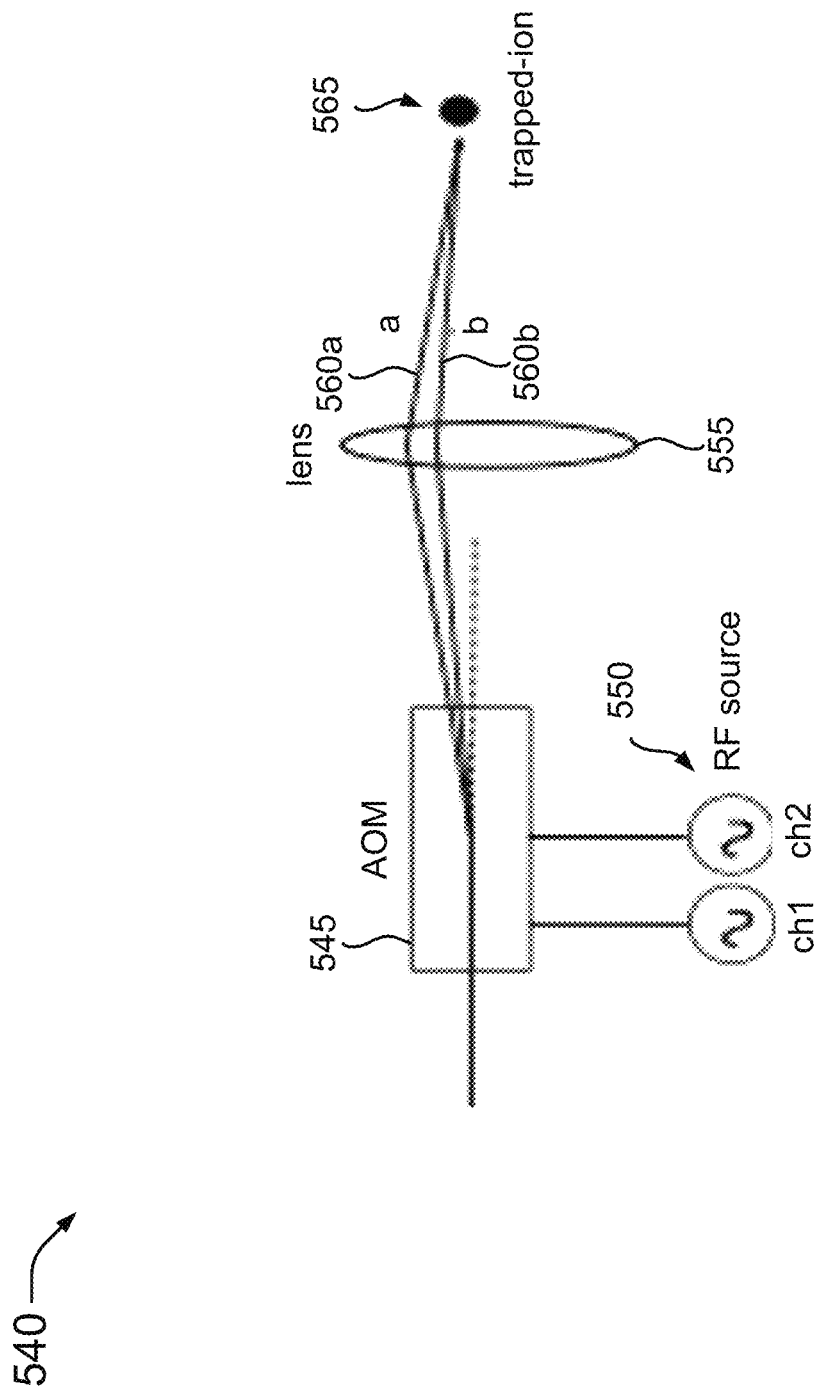
FIG. 5B illustrates an example of an SQG implementation using co-propagating Raman beams in accordance with aspects of this disclosure.
Figure 5C:
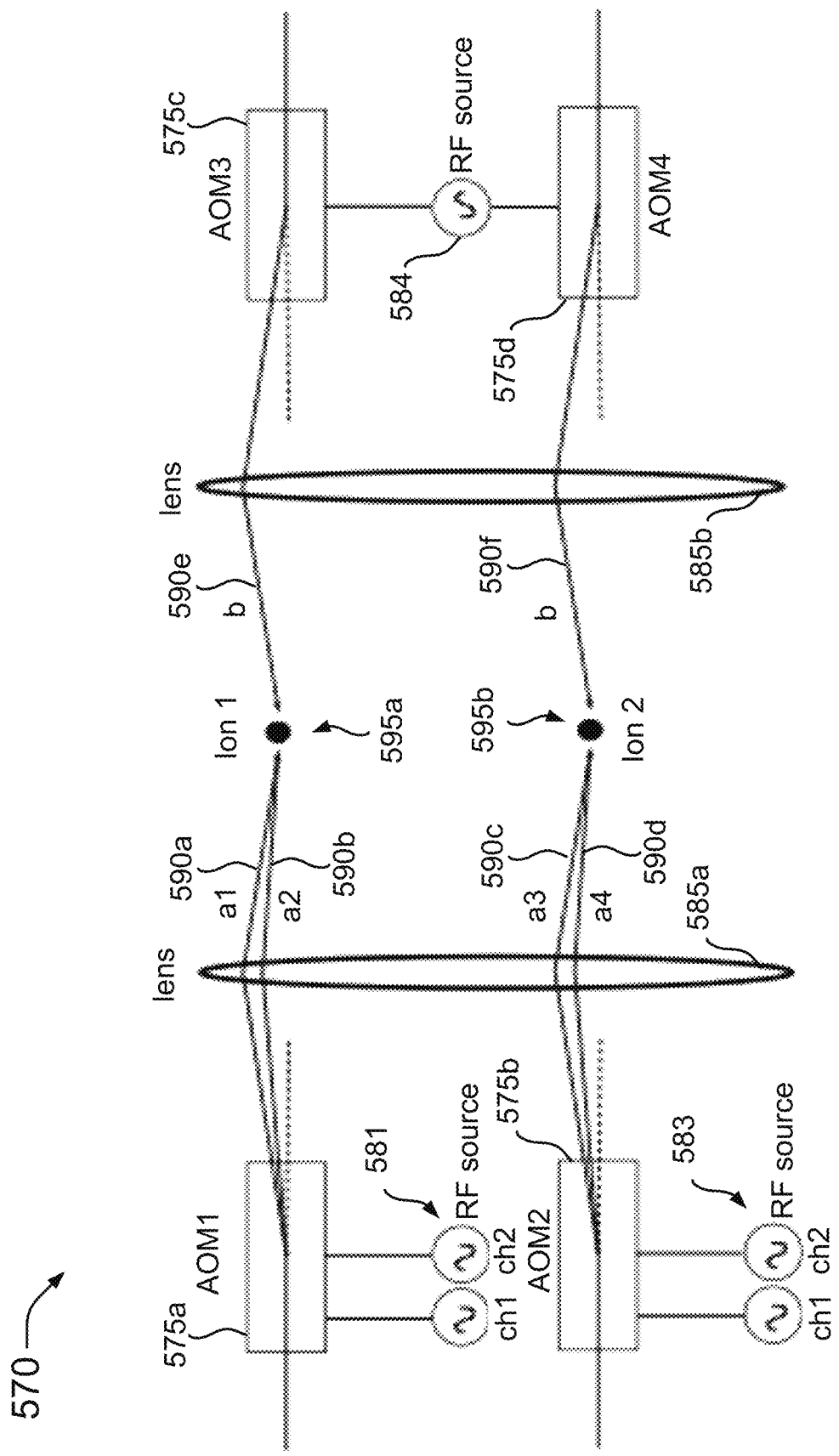
FIG. 5C illustrates an example of a two-qubit gate (TQG) implementation in accordance with aspects of this disclosure.
Figure 6:
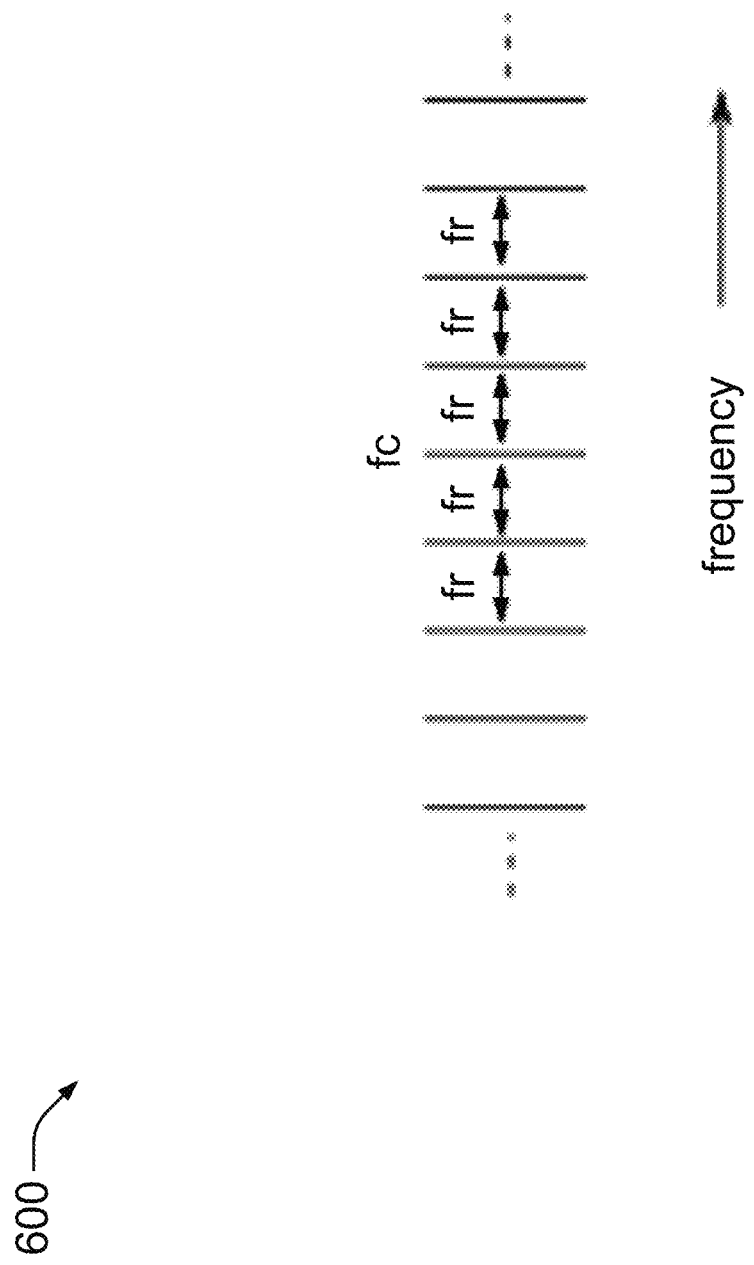
FIG. 6 illustrates an example of a repetition rate fr of a laser and centered around a center frequency fc of the laser in accordance with aspects of this disclosure.

FIGS. 4-6 are described below and provide background information related to mechanisms of light-shifts in trapped-ion gates (i.e., quantum gates implemented using trapped ions). FIG. 4 shows an energy level diagram 400 that illustrates an example of a Raman process that can be used to perform quantum gates on a qubit defined by energy levels or qubit states 0 and 1, labeled 405 and 410 respectively. These energy levels are split by a frequency f0, also referred to as the qubit frequency. The diagram 400 may correspond to the energy levels of the atomic ions 106 trapped in the chain 110 in FIG. 1. A pair of Raman laser beams a and b, labeled 415 and 420 respectively, are shown as vertical lines with double arrows. These Raman laser beams can cause interactions or coupling between the qubit states 0 and 1 and multiple excited electronic states 425, identified here as, e0, e1, e2, etc. This coupling can shift the frequency (or similarly the energy) of the qubit states 0 and 1, which is referred to as a light-shift. Almost always, the shift of qubit state 0 and the shift of qubit state 1 are unequal, causing a change of qubit frequency f0, and this inequality is responsible for a dephasing error in quantum gates.

This effect, however, can be compensated by controlling (one or both of) the frequencies of the Raman laser beams a and b, which drive a quantum gate. For example, one or both of a frequency fa that drives Raman laser beam a and a frequency fb that drives Raman laser beam b can be controlled for light-shift compensation. Usually, the frequencies fa and fb are tuned in a way such that the difference between them (fa-fb) is close to or resonant with the qubit frequency f0. If the qubit frequency itself shifts during the course of a quantum gate, one can shift one of the Raman beam frequencies to stay resonant with the qubit. This way a relative phase accumulation between the qubit and the driving lasers is suppressed, thereby eliminating dephasing errors.

The mechanism of light-shifts is universally present in quantum gates using stimulated Raman transitions in trapped-ions where the qubit states are strongly coupled through a virtual excitation of the excited states 425 (e0, e1, e2, etc.), and therefore can be used to manipulate the qubit. Besides coupling to the excited electronic levels (which causes light-shifts), the qubit states also have several ancillary couplings with other ground state energy levels 430 of the trapped-ion, identified here as, g0, g1, g2 etc. Since these couplings are not resonant, or in other words, fa-fb is not resonant with any transition between any pair of ground states other than states 0 and 1, there is no direct transition between the qubit states and the ancillary ground states. However, these off-resonant couplings can cause a shift in the energy states of the qubit through light shifts. In this disclosure, consideration is given to these two forms of light-shifts, the one that arises from the qubit states coupling to excited electronic states 425, and the one that arises from coupling to ancillary ground electronic states 430 of the qubit. This disclosure presents techniques devised to measure and precisely calibrate the amount of light-shift as a function of the Raman laser beam amplitude (electric field amplitude at the ion position) such that they can be compensated for in quantum gates.

FIG. 5A shows a diagram 500 that illustrates an example of a setup for implementing single qubit gates (SQGs) using non-copropagating Raman laser beams a and b, labeled as 515a and 515b respectively. In this example, the control of phase, frequency and amplitude of each beam is implemented by programming a radio frequency (RF) source that drives acousto-optic modulators (AGMs). For example, an AOM1 505a coupled to an RF source 510a are used to control the laser beam a (515a). Similarly, an AOM2 505b coupled to an RF source 510b are used to control the laser beam b (515b).

The beams are focused on a trapped ion qubit 525 (see e.g., qubits 106 in FIG. 1) using lenses. For example, a lens 520a is used to focus the laser beam a onto the trapped ion qubit 525, and a lens 520b is used to focus the laser beam b onto the same qubit but from a different direction.

In the setup described in the diagram 500, laser beam b may have a static frequency, phase and amplitude, whereas laser beam a may be modulated in frequency, phase and amplitude in order to affect the desired quantum gate operation. Alternatively, in other setups the opposite may be the case where laser beam a remains static or it may be possible to modulate both laser beams. Back to this setup, due to the dynamic nature of the amplitude of Raman laser beam a, the light-shifts contributed by the laser beam requires to be calibrated as a function of the RF gain parameter, which linearly changes the Raman laser beam electric field amplitude. Once calibrated, the precise adjustment of the frequency of the AOM can be programmed to compensate for the light-shift induced qubit dephasing.

It is to be understood that when multiple trapped-ion qubits are used, the setup shown in the diagram 500 may be repeated in whole or in part to each of the qubits.

FIG. 5B shows a diagram 540 that illustrates an example of a setup for implementing single qubit gates (SQGs) using co-propagating Raman laser beams a and b, labeled as 560a and 560b respectively. In this example, the control of phase, frequency and amplitude of each beam is implemented by programming RF Channel 1 (ch1) and RF Channel 2 (ch2) of a 2 channel RF source that drives a single AOM per qubit. Shown in the diagram 540 are an AOM 545 and a two-channel RF source 550 used for this purpose.

The laser beams are focused on a trapped ion qubit 565 using a lens 555. In this setup, laser beam b may be static, whereas laser beam a may be modulated in frequency, phase and amplitude by programming RF Channel 1in the RF source 550 in order to affect the desired quantum gate operation. Alternatively, in other setups the opposite may be the case where laser beam b remains static or it may be possible to modulate both laser beams. Back to this setup, due to the dynamic nature of the amplitude of Raman laser beam a, the light-shifts contributed by the laser beam requires to be calibrated as a function of the gain parameter, which linearly changes the Raman laser beam electric field amplitude. Once calibrated, the precise adjustment of the frequency of RF Channel 1 can be programmed to compensate for the light-shift induced qubit dephasing.

FIG. 5C shows a diagram 570 that illustrates an example of a setup for implementing a two-qubit gate (TQG), which entangles a pair of qubit ions, and can be immersed inside a chain of ions of a multi-qubit trapped-ion processor (see e.g., FIG. 1). The TQG requires an individually addressing laser beam pair on each of the ions. For example, laser beams a1 and a2, labeled 590a and 590b respectively, are applied onto Ion 1, labeled 595a. Moreover, laser beams a3 and a4, labeled 590c and 590d, respectively, are applied onto Ion 2, labeled 595b. Moreover, a global laser beam b, labeled 590e for Ion 1 and 590f for Ion 2, could either be a single laser beam or a pair of laser beams illuminating both ions.

The global laser beam or beams can be driven by a single RF source as they can be chosen to be static in amplitude, frequency and phase. In this set up, they are driven by a single RF source 584 through AOMs 575c and 575d. The individual beams a1, a2, a3 and, a4 on the other hand, can each have programmed dynamic amplitude, frequency and phases affected by two-channel RF sources each driving an AOM corresponding to each ion of the pair. In this setup, laser beams a1 and a2 are controlled by two-channel RF source 581 and AOM1 575a, while laser beams a3 and a4 are controlled by two-channel RF source 583 and AOM1 575b.

To compensate for light-shift induced dephasing in TQGs, techniques are described herein for measuring the static light-shift from global laser beam(s) b on each qubit, and also the relationship of light shifts on the amplitude of individually addressing bichromatic laser beams pairs a1, a2, a3 and, a4. TQGs usually require a time-varying amplitude modulation on the individually addressing bichromatic laser beams, which also results in a variation of the light-shift during the gate. By calibrating the amplitude dependence of light-shift, this can be programmed into a frequency shift of the individually addressing bichromatic laser beam pairs, which allows the compensation of the TQG light-shift.

FIG. 6 shows a diagram 600 that illustrates when a mode-locked pulsed laser is used for implementing Raman transitions, each of the laser beams (a and b) can be considered as comprising of numerous laser beams that are uniformly spaced in their frequency by the repetition rate fr of the laser and centered around the center frequency fc of the laser.

Based on the background information provided in connection with FIGS. 4-6, below are described various aspects of calibrating static light-shifts from global Raman laser beams in SQGs and TQGs.

FIGS. 7A-8E shown below describe a scheme for calibrating gain dependent light-shifts in SQGs. During the period or time an SQG or a TQG is implemented, the global laser beams b (see e.g., FIGS. 5A-5C) can be set to static Raman fields at maximum amplitude by setting the gain factor in the RF source to g=1, where again g is the gain parameter or gain factor. Then, because the global laser beams are set to a default of g=1, and the only gain-factor g that matters is that of the Raman laser beams a, henceforth the gate gain factor g or simply g may only refer to the gain factor associated with the laser beams a.

The modulated Raman laser beams a (e.g., a1, a2, a3 and, a4 in FIG. 5C), can be set to variable gains to tune the SQGs and TQGs to desired gate operations. When the gain factor for Raman laser beam a is set to g=0 it results in no operation except for a phase advance in the participating qubits due to light-shifts from Raman global laser beam b. It is therefore necessary to measure the static light-shift from global laser beams of each type of SQGs and the TQG, which is independent of g. This is accomplished using a Ramsey sequence as shown in a diagram 700 in FIG. 7A, which is a direct probe of quantum coherence in a two-level system.

As shown in the timeline of the diagram 700, a microwave GPI2 pulse is first applied, followed by the global laser beam being turned on for a specified period of time, which is then followed by the applications of a second microwave GPI2 (phi) pulse with a varying phase before a measurement is made at the end of the sequence. A GPI pulse may refer to a pulse associated with a GPi gate, which may be considered a π or bit-flip rotation with an embedded phase. The GPi gate rotates π radians—hence the name—but can also rotate on any longitudinal axis of the Bloch sphere.

Figure 7A:
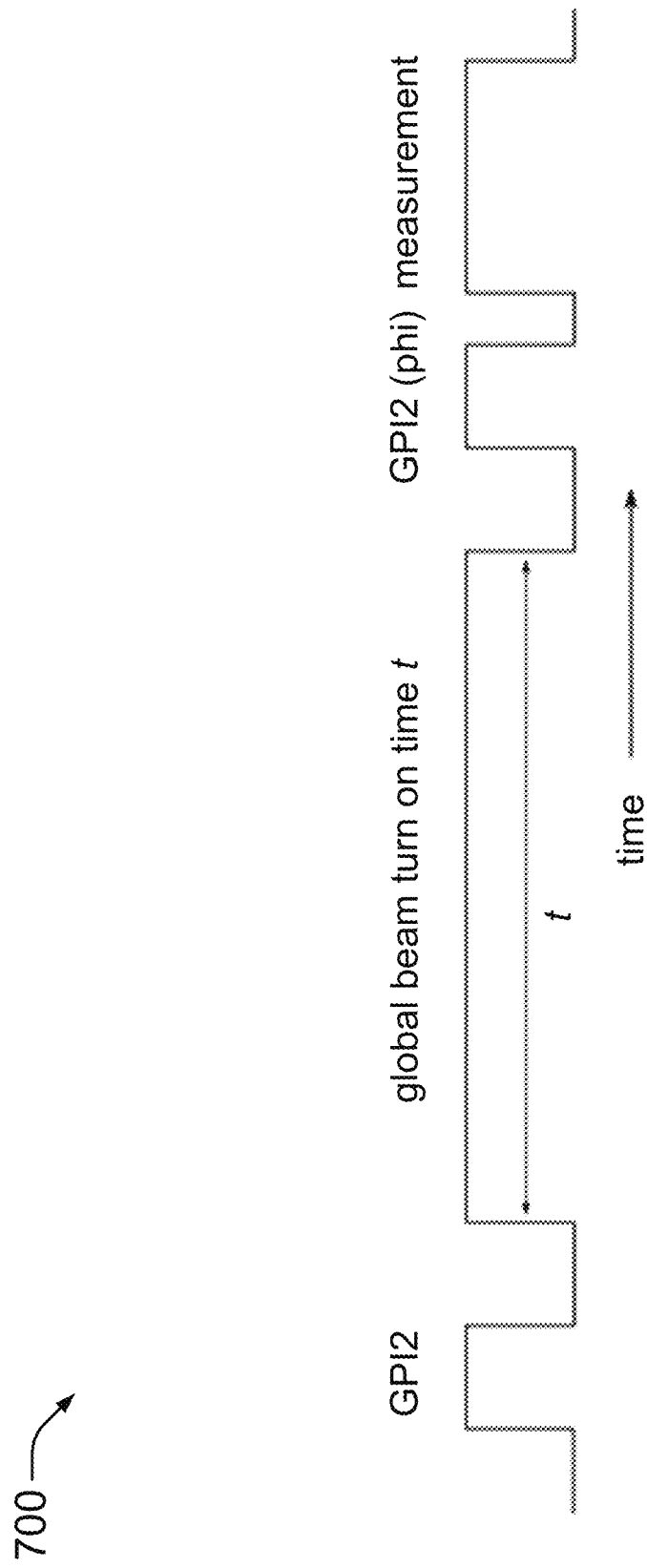
FIG. 7A illustrates an example of a Ramsey sequence in accordance with aspects of this disclosure.
Figure 7B:
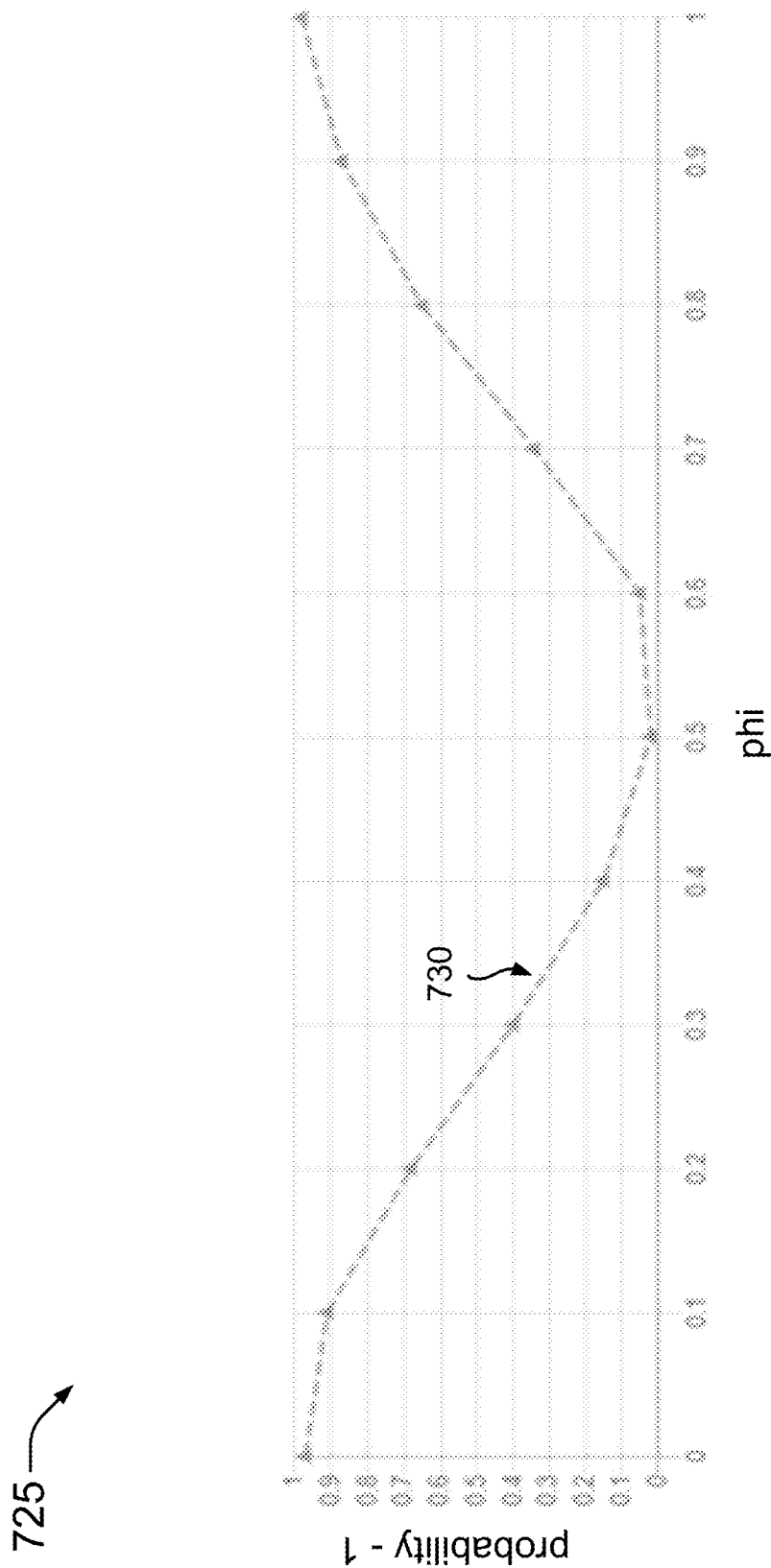
FIG. 7B illustrates an example of a measurement of a qubit state in accordance with aspects of this disclosure.

As shown in a diagram 725 in FIG. 7B, the measurement of the qubit state 730 shows the probability of qubit state 1 to oscillate sinusoidally as the phase of the second microwave GPI2 (phi) pulse is varied from 0 to 1. However, there may be an offset of the phase of this oscillation, which is caused by the light-shift that the qubit experiences due to static Raman laser beam b, which can then be extracted from this measurement. This measurement can be performed for each qubit and for each of the global laser beams b as used in different SQGs and the TQGs.

There are several contributing mechanisms to light-shifts in an SQG Raman setup. In the first mechanism, in SQGs Raman laser beam a couples the qubit states to the excited states (see e.g., excited states 425 in FIG. 4) and the coupling strength, hereby referred to as the Rabi frequency R, is proportional to the amplitude of electric field in a, and therefore proportional to g. Since the light-shift is proportional to $R^2$, it scales with gain factor g as $g^2$ (or g squared).

In the second mechanism, Raman laser beams a and b together (off-resonantly) couple the qubit states with the ancillary ground states (see e.g., ground states 430 in FIG. 4) with a Rabi frequency that is proportional to the electric field amplitude of a and therefore g. Hence, the light-shift resulting from this interaction also scales with gain factor g as $g^2$ (or g squared).

In the third mechanism, as mentioned above, when a mode-locked pulsed laser is used for implementing Raman transitions, each of the laser beams (a and b) can be considered as comprising of numerous laser beams that are uniformly spaced in their frequency by the repetition rate fr of the laser and centered around the center frequency fc of the laser (see e.g., FIG. 6). In such a case, even a single Raman laser beam is capable of coupling the ground states since there are several combinations of frequency pairs that can off-resonantly drive a coupling between the qubit states and the ancillary states. In such a case, the Rabi frequency of the coupling R is the product of the field amplitudes of the pairs of self-interfering laser beams. Since the amplitude of each component laser beam in Raman laser beam a is linearly proportional to gain factor g of Raman laser beam a, therefore R is proportional to $g^2$. Since the light-shift from these couplings (as stated in the second mechanism above) is proportional to $R^2$, hence it scales with gain factor g as $g^4$ (or g to the fourth power).

Thus, there are three mechanisms identified for contributing to light-shifts. The first and second mechanisms giving rise to a $g^2$ light-shift and the third mechanism gives rise to a $g^4$ fight-shift. It is, therefore, sufficient to assume the following relationship of light-shift to the gain factor:

$$\text{Light-shift} = s2 \times g^2 + s4 \times g^4,$$

where, s2 and s4 are the coefficients that need to be calibrated per qubit for each type of SQG to correct for dephasing errors.

A technique for measuring the SQG light-shift coefficients s2 and s4 may involve the following operations.

Figure 8A:
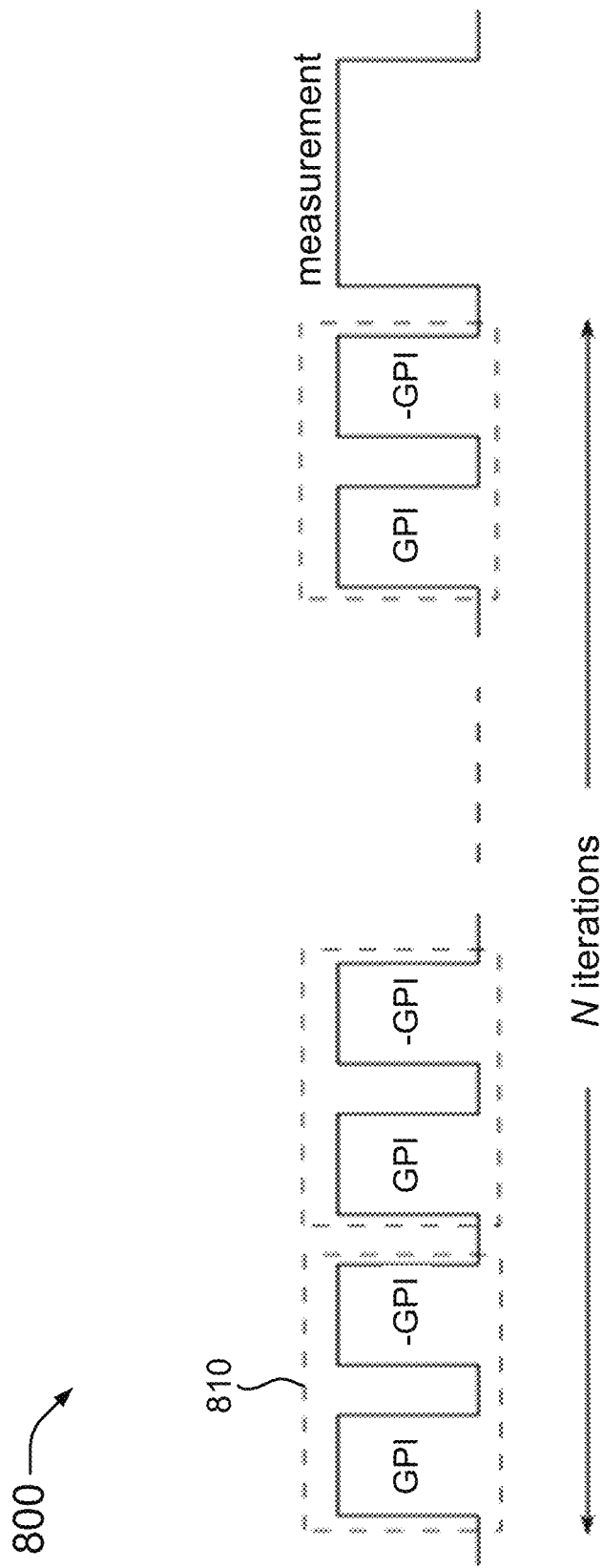
FIG. 8A illustrates an example of a pulse sequence consisting of N iterations of a GPI and -GPI SQG gate operation and measurement of qubit probability in accordance with aspects of this disclosure.
Figure 8B:
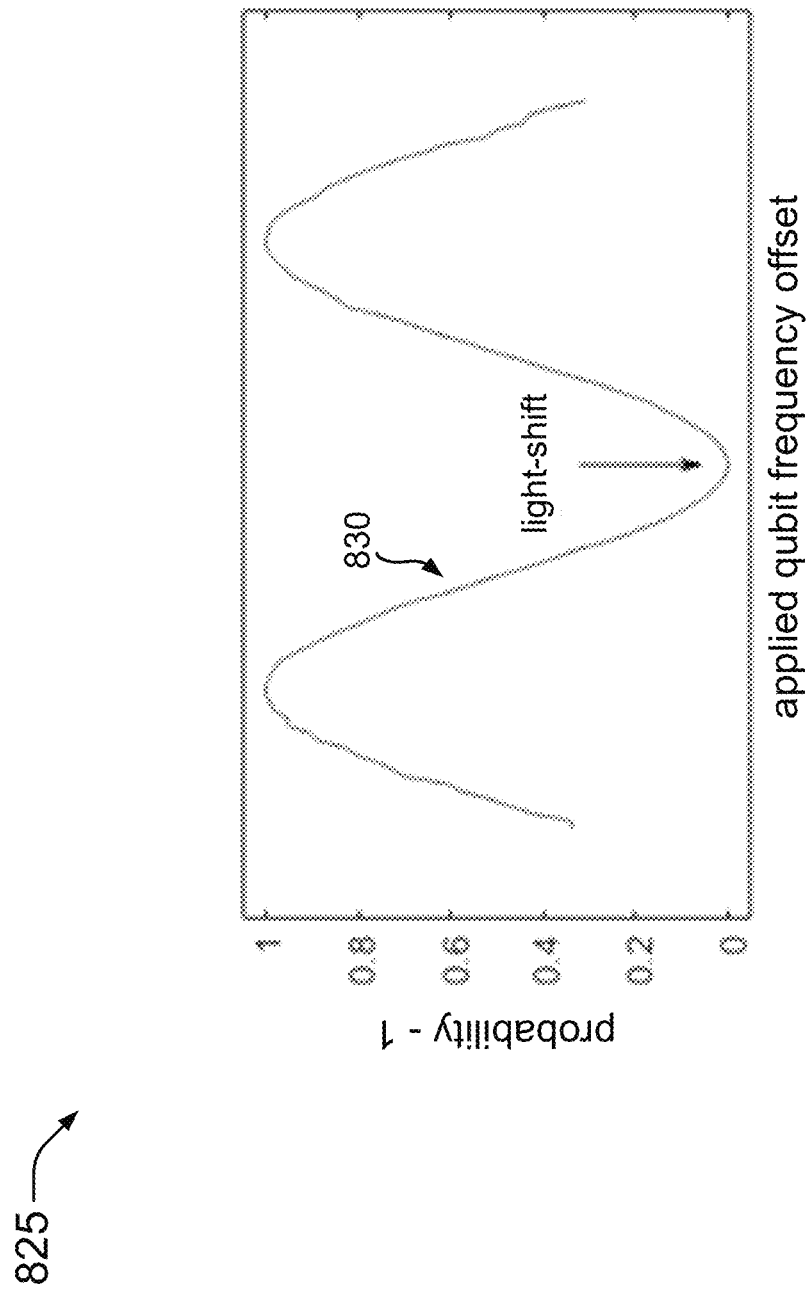
FIG. 8B illustrates an example of an applied qubit frequency offset representing the measured signal in FIG. 8A in accordance with aspects of this disclosure.
Figure 8C:
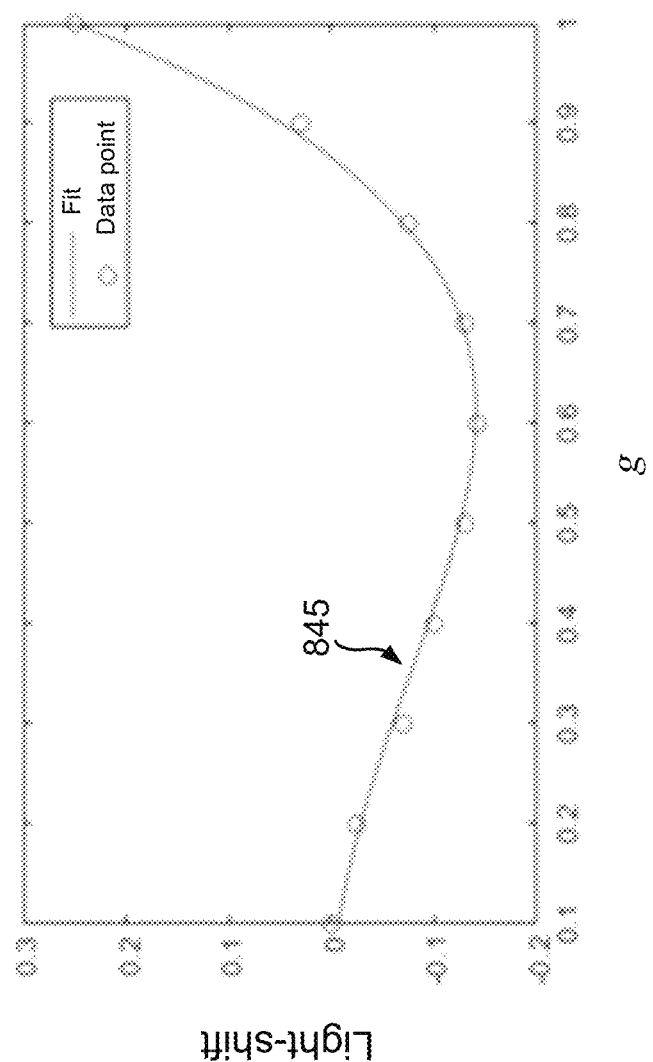
FIGS. 8C and 8D illustrate examples of a set of data points of the value of light shifts for various values of the gain parameter g in accordance with aspects of this disclosure.
Figure 8D:
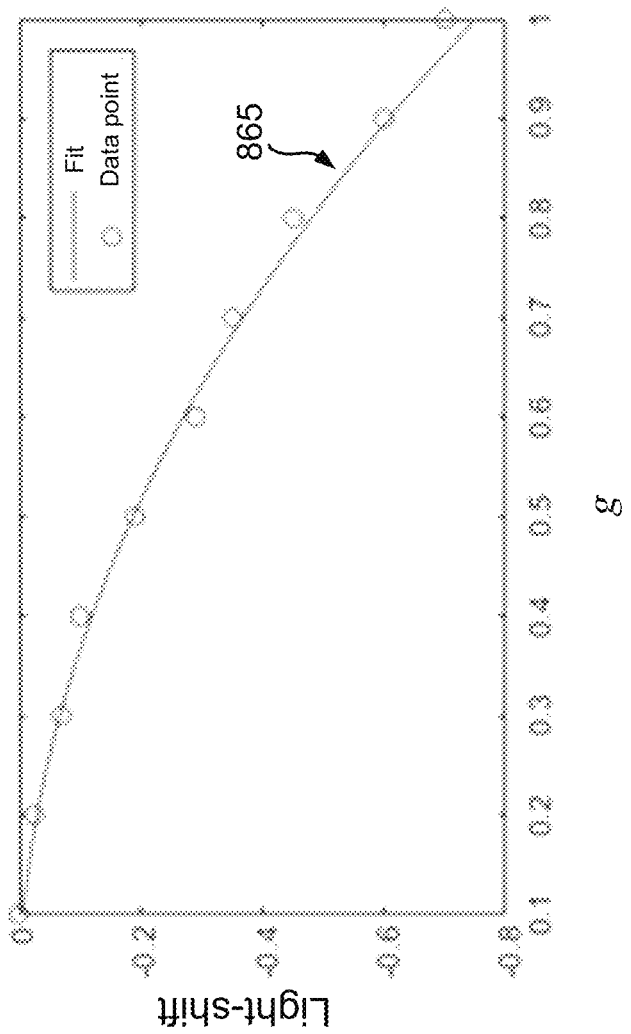
Figure 8E:
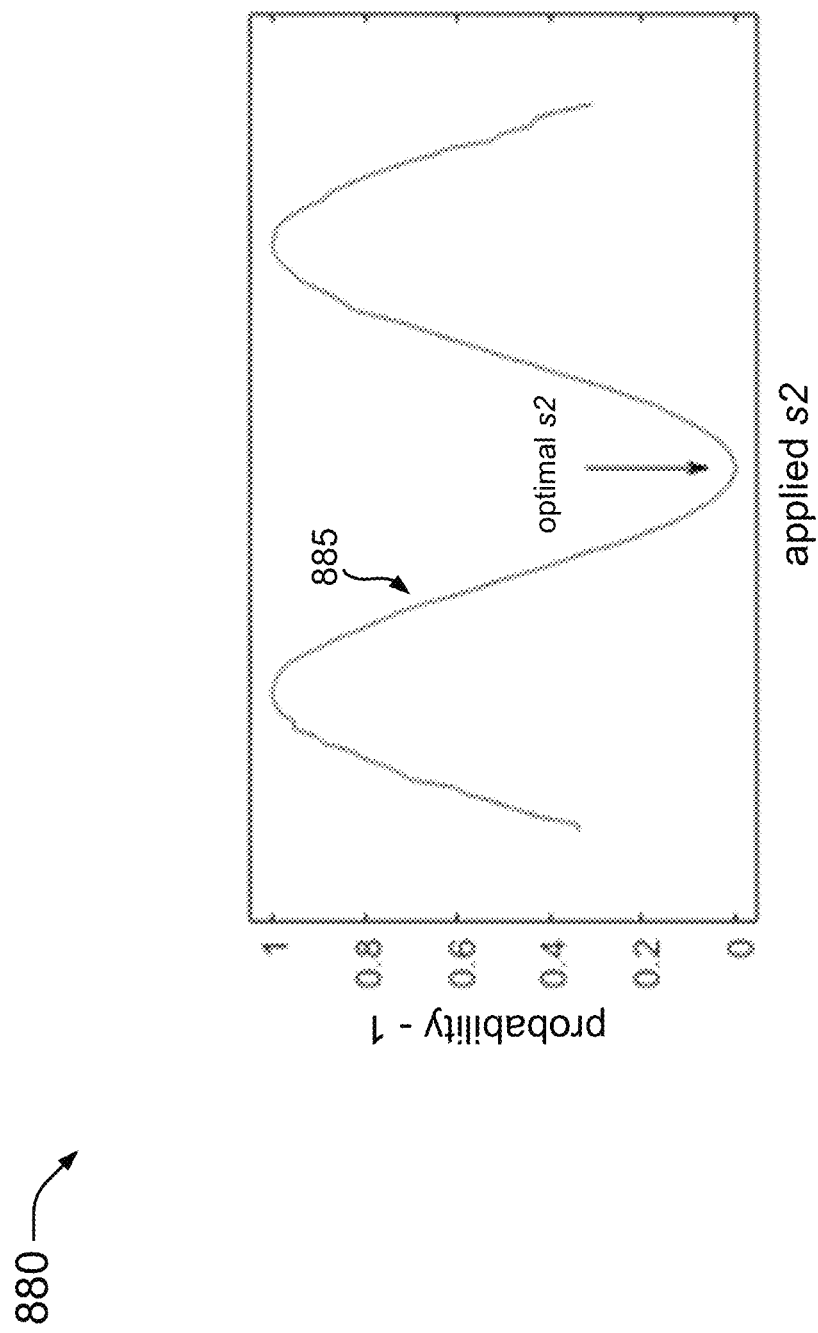
FIG. 8E illustrates an example of the measured signal in FIG. 8A where the minima corresponds to an optimal value of s2 in accordance with aspects of this disclosure.

FIG. 8A shows a diagram 800 that illustrates a first step (a) in which a pulse sequence that is applied consisting of N iterations of a GPI and -GPI single qubit gate operation 810, where a GPI gate flips the qubit state from 0 to 1 and a -GPI gate flips the qubit state back from 1 to 0. The SQG GPI gates are applied using the same Raman scheme as corresponds to the SQG scheme that is being calibrated for (FIGS. 5A, 5C). This gate sequence is followed by the measurement of the qubit probability to be in state 1. The GPI and -GPI pulses have the Raman laser beam a set to the same constant gain factor -g but with a π relative phase shift between the two.

Then, in a second step (b), a frequency offset is applied on Raman laser beam a such that fa-fb is scanned around qubit resonance. This is referred to as the "applied qubit frequency offset" in the horizontal axis of a diagram 825 in FIG. 8B, which represents the measured signal. For the measurement 830 of the probability of qubit state 1, a minimum signifies the value of the light-shift experienced by the qubit at the set gain factor g of the GPI pulses.

The two steps (a) and (b) described above can be repeated for different values of g. Need to make sure, however, that the GPI gate operation stays the same for different values of g by changing the pulse duration such that g×pulseDuration=constant. This allows to generate a set of data points that represents the value of SQG light shifts for various values of g, as shown in a diagram 840 in FIG. 8C.

The data points in the diagram 840 can be fit to a polynomial 845 represented by $s2 \times g^2 + s4 \times g^4$, and thereby it is possible to obtain the second and fourth order SQG light-shift coefficients, respectively, from the data fit.

The calibrated coefficients of the SQG gates can be used for any SQG operation that uses the same Raman laser beam configurations, and can program a dynamic gain dependent light-shift based on the relationship Light-shift=$s2 \times g^2 + s4 \times g^4$, into the RF channels driving laser beam a. The number of iterations N shown can be tuned to increase sensitivity of the measured signal shown in FIG. 8B.

Under certain circumstances it might be possible to suppress the coupling between the qubit states and the ancillary ground states, which arises from Raman laser beam a alone. For, example the polarization of the Raman laser beam can be set such that this type of coupling is highly suppressed. This suppresses the fourth order light-shift term, or in other words s4 approaches or is very close to 0 (s4→0). This can be observed using the aforementioned SQG light-shift technique as seen in a diagram 860 in FIG. 8D, where the data points closely be fit to a line 865 with a $g^2$ trend. For this case, the SQG light-shift calibration can then be simplified.

An abridged or simplified technique for SQG light-shift calibration of s2 is as follows. In a first step (a), a pulse sequence is applied consisting of N iterations of a GPI and -GPI single qubit operation, where a GPI gate flips the qubit state from 0 to 1 and a-GPI SQG operation flips it back from 1 to 0 as described in FIG. 8A. The GPI gates are applied using the same Raman scheme as corresponds to the SQG scheme that is being calibrated for (FIGS. 5A, 5C). This gate sequence is followed by the measurement of the qubit probability to be in state 1. The corresponding GPI and -GPI pulses have the Raman laser beam a set to the same constant gain factor -g but with a $\pi$ relative phase shift between the two.

In a second step (b), a light-shift=$s2 \times g^2$ (where s4→0) is applied to the Raman laser beam while scanning the value of s2. The data that results may then look similar to a diagram 880 in FIG. 8E, where the measurement 885 of the probability of qubit state 1, a minimum corresponds to an optimal value of s2, that captures the $g^2$ dependence of the SQG light-shift. The number of iterations N can be tuned to increase sensitivity of the measured signal shown in FIG. 8E.

Figure 9A:
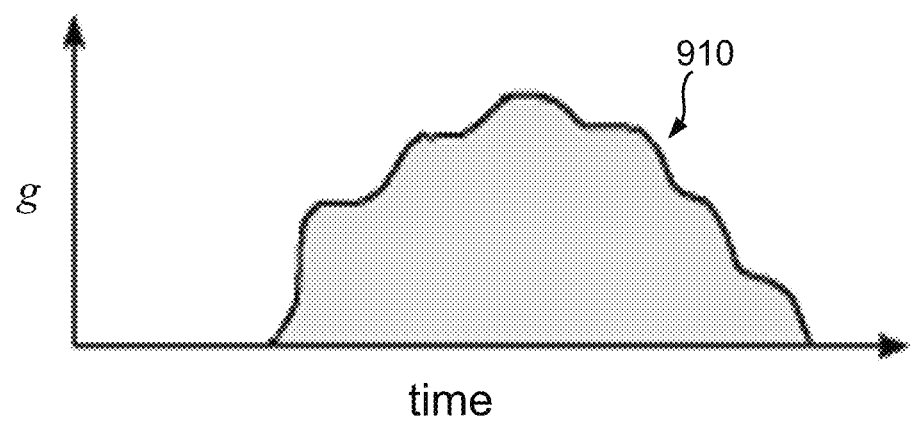
FIG. 9A illustrates an example of the modulation of the gain parameter g during a two-qubit gate (TQG) in accordance with aspects of this disclosure.
Figure 9B:
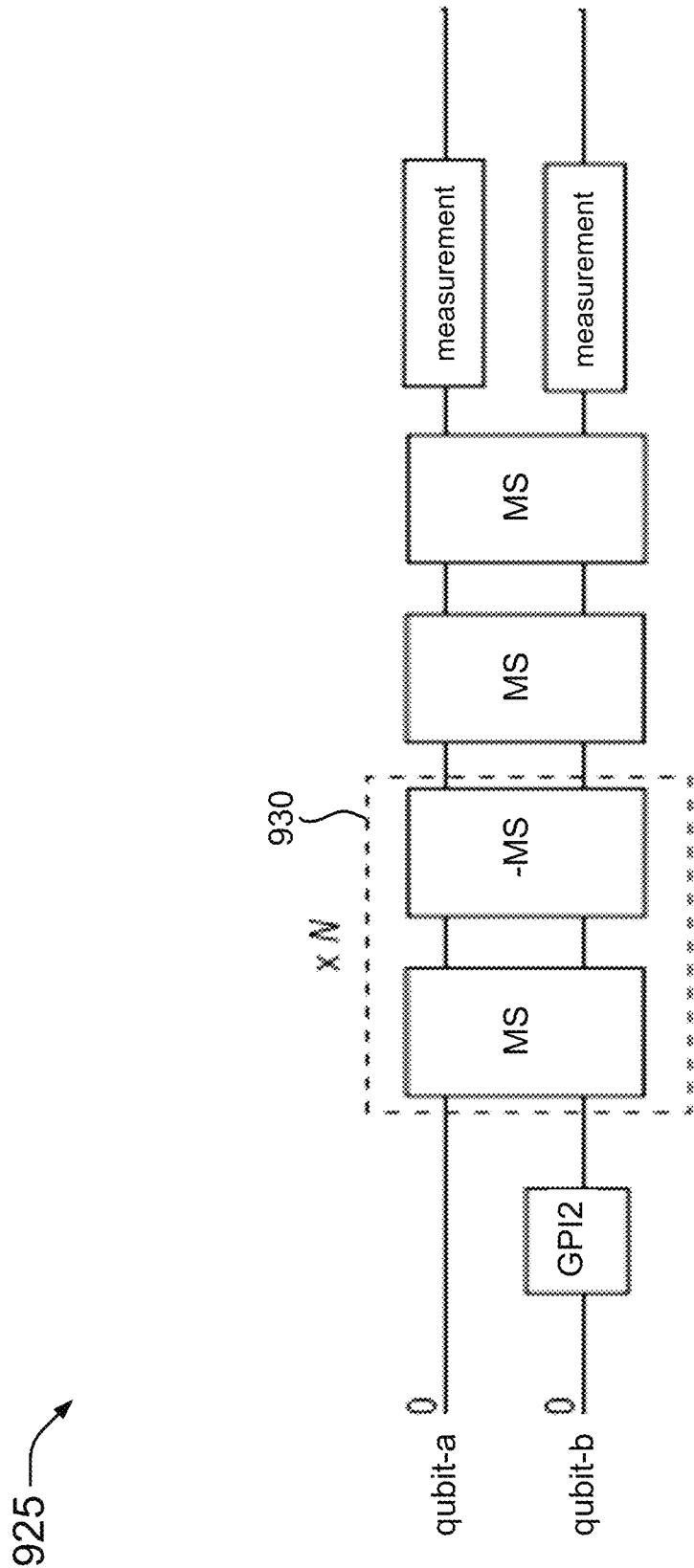
FIG. 9B illustrates an example of a gate sequence for calibrating m2 on a qubit-a where qubit-b is the second qubit in a TQG in accordance with aspects of this disclosure.
Figure 9C:
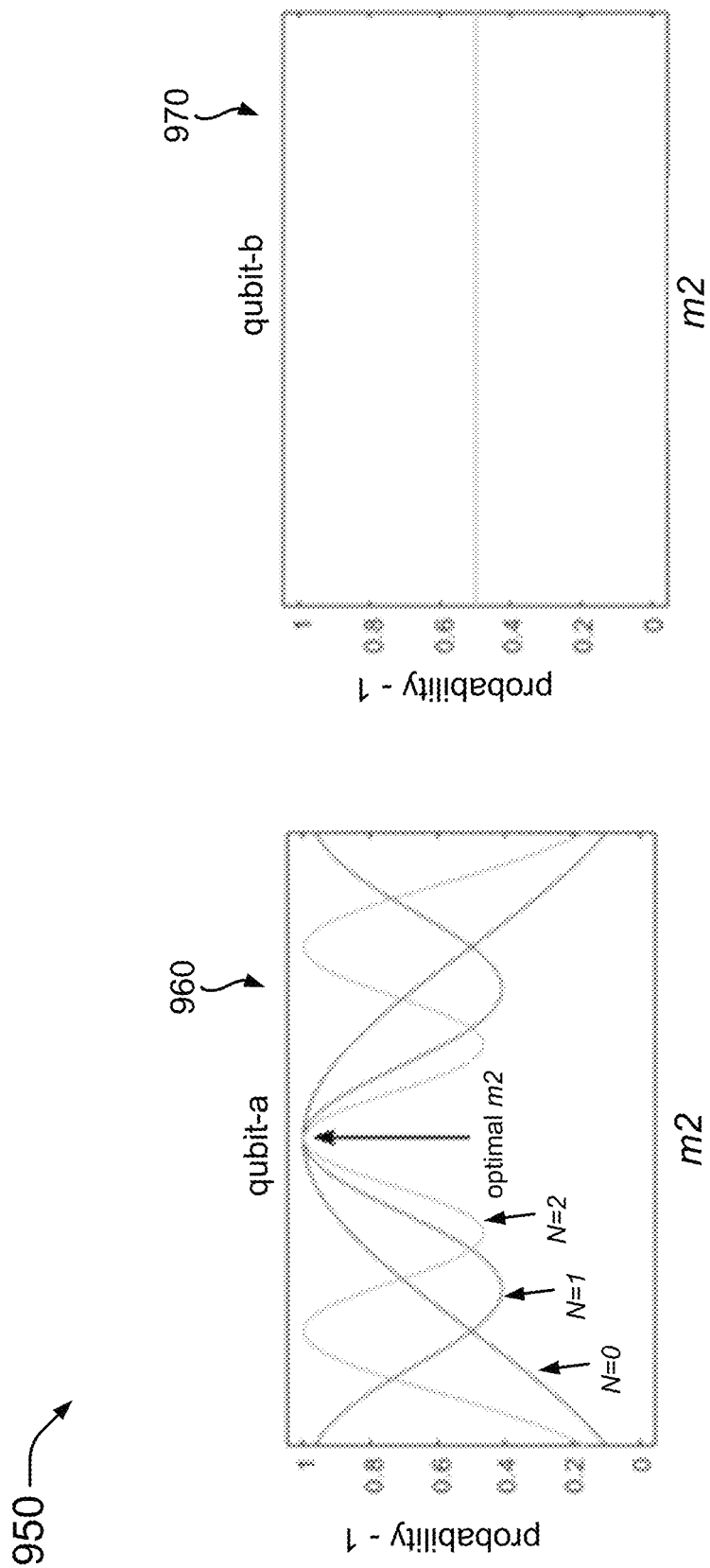
FIG. 9C illustrates an example of measured data from the gate sequence in FIG. 6B in accordance with aspects of this disclosure.

FIGS. 9A, 9B, and 9C show diagrams 900, 925, and 950, respectively, that illustrate a scheme for calibrating gain dependent light-shifts in TQGs, and more specifically calibrating the light-shift coefficient m2 for TQGs described in more detail below.

As discussed in the SQG light-shift calibration schemes described above, the fourth order light-shift (proportional to $g^4$) can be suppressed in hardware by setting the polarization and laser repetition rate (fr) such that light-shift proportional to $g^2$ is predominant during SQGs. This concept also applies for TQGs. Additionally, under these conditions the dependence of light-shift at lower values of gain approximately follows a $g^2$ relationship as is evident from plots in FIGS. 8C and 8D.

When this assumption is true, it is possible to directly attempt to measure the second order coefficient m2, for TQG light-shift=$m2 \times g^2$.

The diagram 900 in FIG. 9A illustrates a representative plot 910 of the modulation of the gain parameter g during a TQG. In this scheme, it is assumed that all Raman laser beams a1, a2, a3 and, a4 (FIG. 5C) are set to a common gain factor g.

The diagram 925 in FIG. 9B represents a gate sequence for calibrating m2 on a qubit-a where a qubit-b is the second qubit in the TQG. Both qubits are initialized to qubit state 0, with an additional SQG on qubit-b (GPI2), which prepares it in an equal superposition of states 0, and 1. The chosen TQG is a Mølmer-Sørensen (MS) gate that creates maximal entanglement between two qubits. A -MS gate is the inverse of an MS gate. While applying each MS gate, a detuning in the laser beams a1 and a2 (which address qubit-a, same as Ion 1 in FIG. 5C) are applied depending on the instantaneous gain factor g as $m2 \times g^2$ (which can be time varying as illustrated in FIG. 9A). The MS gate pairs 930 enclosed in the dotted box can be repeated N times to increase sensitivity of the measurement. The gate sequence is followed by a measurement of each qubit.

An example of the measurements resulting from the sequence in the diagram 925 in FIG. 9B is provided in a diagram 950 in FIG. 9C, where qubit-a (left hand plot 960) sees a variation of the probability of being in state 1 when m2 is scanned over a range of values (e.g., N=0, 1, or 2), where the optimal m2 value is where the data is at its maximum. The signal on qubit-b (right hand plot 970) remains relatively flat. At the optimal m2 value the applied light shift ($m2 \times g^2$) on Raman laser beams a1 and a2 drives the MS gate at the light-shifted qubit resonance, thereby compensating for any dephasing errors that could accumulate on qubit-a otherwise. To calibrate for m2 for qubit-b the same technique is applied, but the qubits are switched and the light-shifts are applied on Raman beams a3 and a4 that address qubit-b (Ion 2 of FIG. 5C).

Figure 10:
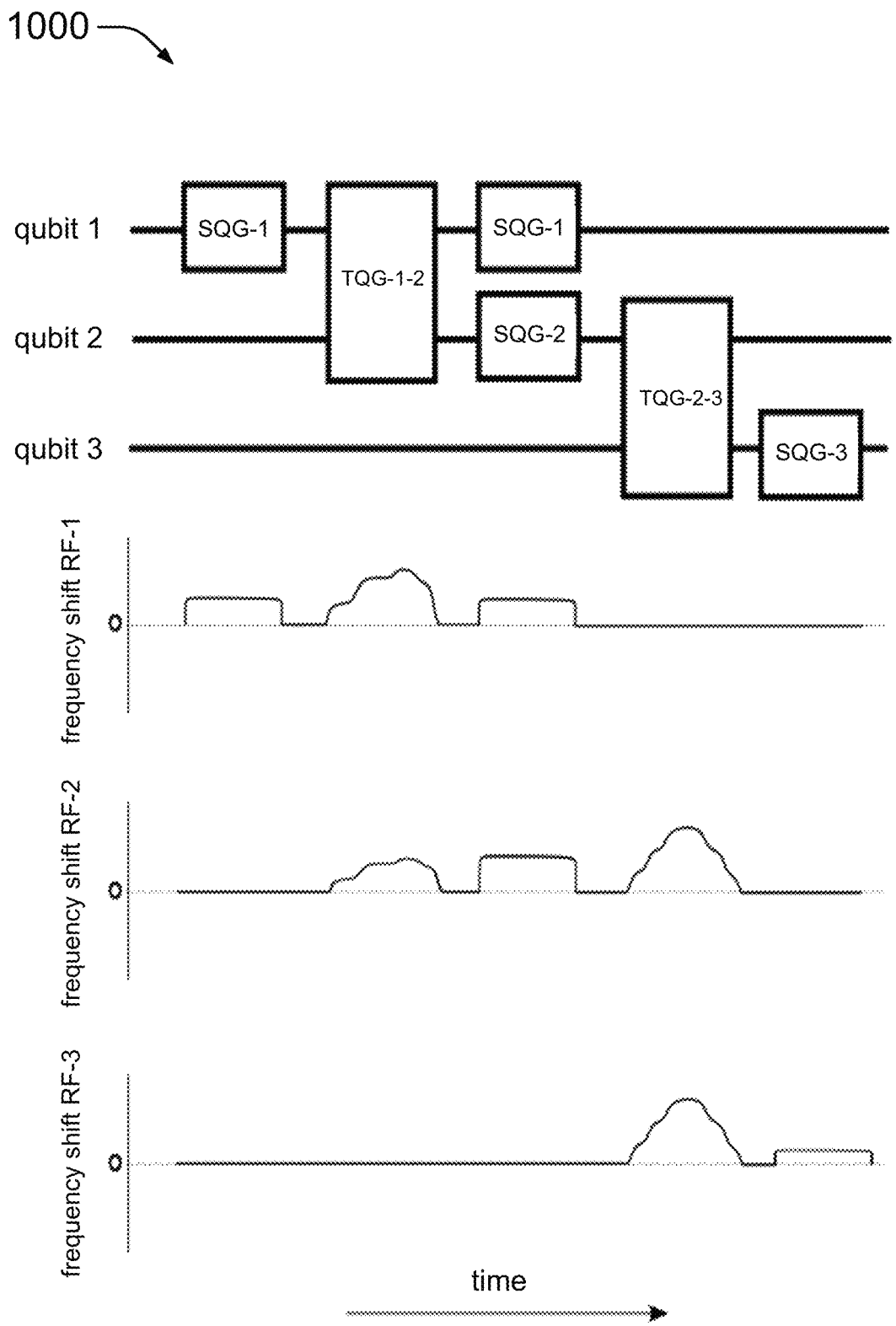
FIG. 10 illustrates an example of a scheme for correcting light-shift dephasing errors in quantum gates and algorithms in accordance with aspects of this disclosure.

FIG. 10 shows a diagram 1000 that illustrates an example of a scheme for correcting light-shift dephasing errors in quantum gates and algorithms using software or firmware. The software or firmware may be stored in and executed by a component of a quantum computer or QIP system. This example is a simple three qubit quantum algorithm circuit (e.g., qubit 1, qubit 2, and qubit 3) consisting of a collection of SQGs and TQGs and is intended to be illustrative and not limiting. For example, a first SQG-1 and a second SQG-1 are used with qubit 1, an SQG-2 is used with qubit 2, and an SQG-3 is used with qubit 3. Between qubits 1 and 2 there is a TQG-1-2 and between qubits 2 and 3 there is an TQG-2-3. Shown at the bottom of diagram 100 are the types of frequency shifts applied to the different gates for the different qubits as a function of time.

Each gate is performed at some gain g, which might be static (here SQG gates are assumed to have static gains but it is not necessary for application of this method) or dynamic in time (TQG gates normally always have a dynamic gain applied during the gate). The calibrated coefficient of gain dependent light-shifts s2, s4 (FIGS. 7A-8E), and m2 (FIGS. 9A-9C), as well as the static light-shift caused by the global Raman beam (See FIGS. 4B, 4C, and 4D) can be used to program a dynamic frequency shift, equal to the expected light-shift due to the corresponding SQG or TQG, onto the RF frequency that drives the AOMs, which individually drive Raman laser beams of each qubit. This frequency shift subsequently gets applied to the Raman laser beams that are modulated by the AOMs of each qubit. This makes certain that the Raman beat note, fa-fb, stays resonant to the dynamic light-shift experienced by each qubit. This is how a correction of light-shift effects that each qubit experiences during any quantum gate operation can be achieved, as the relative frequency difference between the Raman laser beam beat note driving a gate and the light-shifted qubit is minimized to zero, thereby preventing any dephasing error that could otherwise have accumulated over many gate operations in any quantum algorithm.

FIG. 11 shows a method 1100 for correcting light-shift effects in single qubit gates. At 1110, the method 1100 includes applying a pair of Raman laser beams to single trapped ions in a trapped ion chain used for the single qubit gate. At 1120, the method 1100 includes determining one or more parameters that describe a relationship between a gain factor of one of the Raman laser beams and a light-shift effect that causes a change in resonance of qubit states of the single qubit gate by coupling of the qubit states to other states of the single qubit gate. At 1130, the method 1100 includes dynamically adjusting a gain and a frequency of an RF source for the one Raman laser beam based on the one or more parameters to correct for dephasing errors in the single qubit gate caused by the change in the resonance of then qubit states.

In another aspect of the method 1100, the pair of Raman laser beams are applied in a non-copropagating gate scheme (e.g., FIG. 5A).

In another aspect of the method 1110, the pair of Raman laser beams are applied in a co-propagating gate scheme (e.g., FIG. 5B).

In another aspect of the method 1100, the one or more parameters include a second order gain parameter (e.g., s2) and a fourth order gain parameter (e.g., s4).

In another aspect of the method 1100, the method 1100 further includes applying a polarization to one or more Raman laser beams to null out the fourth order gain parameter (e.g., s4→0) from the gain of the RF source for the one Raman laser beam.

A quantum computer (e.g., quantum computer 300 or QIP system 200) configured to correct light-shift effects on single qubit gates is described that includes a trap (e.g., trap 270) configured to hold a trapped ion chain (e.g., chain 110), an optical controller (e.g., optical and trap controller 220) configured to apply a pair of Raman laser beams to single trapped ions in the trapped ion chain used for the single qubit gate, and a general controller (e.g., general controller 205) configured to determine one or more parameters that describe a relationship between a gain factor of one of the Raman laser beams and a light-shift effect that causes a change in resonance of qubit states of the single qubit gate by coupling of the qubit states to other states of the single qubit gate. The optical controller is further configured to dynamically adjust a gain and a frequency of an RF source (e.g., FIG. 5A, 5B) for the one Raman laser beam based on the one or more parameters to correct for dephasing errors in the single qubit gate caused by the change in the resonance of the qubit states.

In another aspect of the quantum computer, the optical controller is configured to apply the pair of Raman laser beams in a non-copropagating gate scheme (e.g., FIG. 5A).

In another aspect of the quantum computer, the optical controller is configured to apply the pair of Raman laser beams in a co-propagating gate scheme (e.g., FIG. 5B).

In another aspect of the quantum computer, the one or more parameters include a second order gain parameter (e.g., s2) and a fourth order gain parameter (e.g., s4).

In another aspect of the quantum computer, the general controller is further configured to control the application of a polarization to one or more Raman laser beams through the optical and trap controller to null out the fourth order gain parameter from the gain of the RF source for the one Raman laser beam.

FIG. 12 shows a method 1200 for correcting light-shift effects in two-qubit gates. At 1210, the method 1200 includes applying a pair of Raman laser beams to each trapped ion used for a qubit in the two-qubit gate. At 1220, the method 1200 includes determining for each qubit in the two-qubit gate, a single parameter that describes a relationship between a gain factor of one of the Raman laser beams applied to the respective trapped ion of the qubit and a light-shift effect that causes a change in resonance of the qubit states of the qubit by coupling of the qubit states with other states of the qubit. At 1230, the method 1200 includes dynamically adjusting for each qubit in the two-qubit gate, a gain and a frequency of an RF source for the one Raman laser beam applied to the respective trapped ion of the qubit based on the single parameter to correct for dephasing errors in the two-qubit gate caused by the change in the resonance of the qubit states in each qubit in the two-qubit gate.

In another aspect of the method 1200, the single parameter is a second order gain parameter (e.g., m2).

In another aspect of the method 1200, the relationship is based on the single parameter by controlling a polarization and a repetition rate of the one Raman laser beam.

In another aspect of the method 1200, the other Raman laser beam applied to the respective trapped ion has a static gain factor.

In another aspect of the method 1200, the other states in the respective trapped ion include excited states (e.g., 425), ancillary ground states (e.g., 430), or both.

A quantum computer (e.g., quantum computer 300 or QIP system 200) configured to correct light-shift effects on single qubit gates is described that includes a trap (e.g., trap 270) configured to hold multiple trapped ions, an optical controller (e.g., optical and trap controller 220) configured to apply a pair of Raman laser beams to each trapped ion in the trap used for a qubit in the two-qubit gate, and a general controller (e.g., general controller 205) configured to determine for each qubit in the two-qubit gate, a single parameter that describes a relationship between a gain factor of one of the Raman laser beams applied to the respective trapped ion of the qubit and a light-shift effect that causes a change in resonance of the qubit states of the qubit by coupling of the qubit states with other states of the qubit. The optical controller is further configured to dynamically adjust for each qubit in the two-qubit gate, a gain and a frequency of an RF source (e.g., FIG. 5C) for the one Raman laser beam applied to the respective trapped ion of the qubit based on the single parameter to correct for dephasing errors in the two-qubit gate caused by the change in the resonance of the qubit states in each qubit in the two-qubit gate.

In another aspect of the quantum computer, the single parameter is a second order gain parameter (e.g., m2).

In another aspect of the quantum computer, the relationship is based on the single parameter by controlling a polarization and a repetition rate of the one Raman laser beam.

In another aspect of the quantum computer, the other Raman laser beam applied to the respective trapped ion has a static gain factor.

In another aspect of the quantum computer, the other states in the respective trapped ion include excited states (e.g., 425), ancillary ground states (e.g., 430), or both.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A quantum system for calibrating quantum gates, the system comprising:
   a trap configured to hold a plurality of trapped ions;
   an optical controller configured to apply a laser beam to at least one ion of the plurality of trapped ions to configure the at least one ion as a qubit gate; and
   a controller configured to determine a parameter associated with a relationship between a gain factor of the laser beam and a light-shift effect that causes a change in resonance of a qubit state of the qubit gate,
   wherein the optical controller is further configured to dynamically calibrate the laser beam based on the determined parameter.

2. The system according to claim 1, wherein the optical controller is configured to dynamically calibrate the laser beam to correct for a dephasing error in the qubit gate caused by the change in the resonance of the qubit state.

3. The system according to claim 1, wherein the laser beam is comprises a pair of Raman laser beams and the qubit gate is a single qubit gate.

4. The system according to claim 3, wherein the controller is configured to determine the parameter associated with the relationship between the gain factor of at least one of the pair of Raman laser beams and the light-shift effect that causes the change in resonance of the qubit state by coupling of the qubit state to other states of the single qubit gate.

5. The system according to claim 3, wherein the optical controller is configured to apply the pair of Raman laser beams in a non-copropagating gate scheme the plurality of trapped ions.

6. The system according to claim 3, wherein the optical controller is configured to apply the pair of Raman laser beams in a co-copropagating gate scheme the plurality of trapped ions.

7. The system according to claim 3, wherein the other states of the single qubit gate include excited states, ancillary ground states, or both.

8. The system according to claim 1, wherein the optical controller is further configured to dynamically calibrate the laser beam by adjusting at least one of a gain and a frequency of a radio frequency (RF) source for the laser beam based on the determined parameter.

9. The system according to claim 8, wherein the determined parameter comprises a second order gain parameter and a fourth order gain parameter.

10. The system according to claim 9, wherein the controller is further configured to apply a polarization to the laser beam through an optical and trap controller to null out the fourth order gain parameter from the gain of the RF source for the laser beam.

11. A method for calibrating quantum gates, the method comprising:
applying, by an optical controller, a laser beam to at least one ion of a plurality of trapped ions in a trap in order to configure the at least one ion as a qubit gate;
determining a parameter associated with a relationship between a gain factor of the laser beam and a light-shift effect that causes a change in resonance of a qubit state of the qubit gate; and
dynamically calibrating, by the optical controller, the laser beam based on the determined parameter.

12. The method according to claim 11, further comprising dynamically calibrating, by the optical controller, the laser beam to correct for a dephasing error in the qubit gate caused by the change in the resonance of the qubit state.

13. The method according to claim 11, wherein the laser beam is comprises a pair of Raman laser beams and the qubit gate is a single qubit gate.

14. The method according to claim 13, further comprising determining the parameter associated with the relationship between the gain factor of at least one of the pair of Raman laser beams and the light-shift effect that causes the change in resonance of the qubit state by coupling of the qubit state to other states of the single qubit gate.

15. The method according to claim 13, further comprising applying, by the optical controller, the pair of Raman laser beams in a non-copropagating gate scheme the plurality of trapped ions.

16. The method according to claim 13, further comprising applying, by the optical controller, the pair of Raman laser beams in a co-copropagating gate scheme the plurality of trapped ions.

17. The method according to claim 13, wherein the other states of the single qubit gate include excited states, ancillary ground states, or both.

18. The method according to claim 11, further comprising dynamically calibrating, by the optical controller, the laser beam by adjusting at least one of a gain and a frequency of a radio frequency (RF) source for the laser beam based on the determined parameter.

19. The method according to claim 18, wherein the determined parameter comprises a second order gain parameter and a fourth order gain parameter.

20. The method according to claim 19, further comprising applying a polarization to the laser beam through an optical and trap controller to null out the fourth order gain parameter from the gain of the RF source for the laser beam.

* * * * *